Feb. 11, 1941.  C. I. MacNEIL  2,231,133
SYNCHRONIZING SYSTEM
Filed March 2, 1940
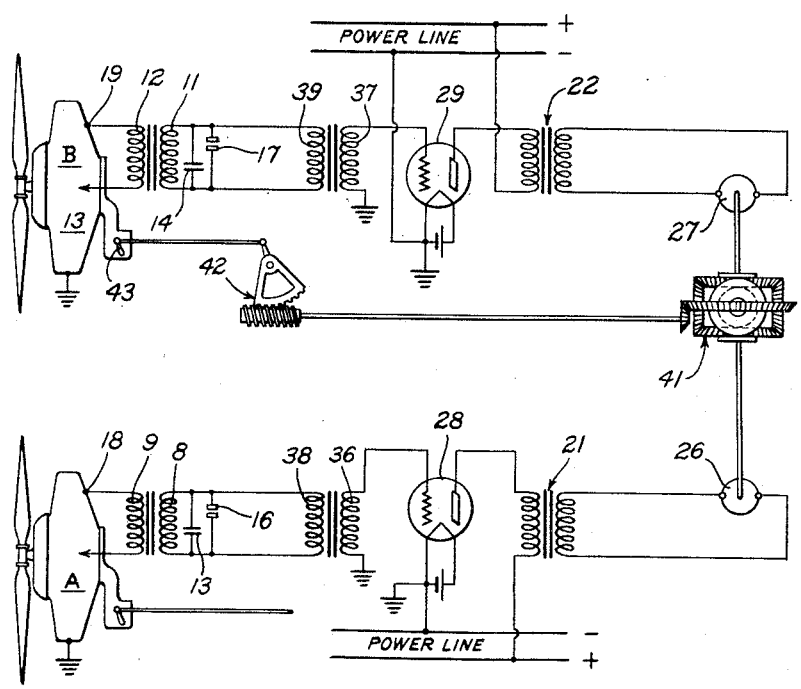
INVENTOR.
Charles I. MacNeil
BY Martin J. Finnegan
ATTORNEY

UNITED STATES PATENT OFFICE 2,231,133

SYNCHRONIZING SYSTEM

Charles I. MacNeil, Glen Ridge, N. J., assignor to Bendix Aviation Corporation, South Bend, Ind., a corporation of Delaware Application March 2, 1940, Serial No. 321,996

7 Claims. (Cl. 60—97)

This invention relates to internal combustion engines and particularly to a plurality of such engines having a tendency to deviate from a desired common speed.

An object of the invention is to provide a synchronizing system including a valve ("throttle" or "choke") actuating differential and means for causing said differential to assume a definite position or condition when the subjects of study, such as the internal combustion engines above suggested, are operating in synchronism, and to move sufficiently to re-establish synchronism when said engines are rotating at different speeds.

Another object is to provide, in a system of the indicated character, a motion differential device and novel operating means therefor, including synchronous alternating current motors, and means for translating the rotation of the respective subject engines into alternating current impulses of a suitable magnitude for operation of said motors, and at frequencies which correspond in each instance to the speeds of the associated engines.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Referring to the drawing, the schematic illustration includes the electrical features of a pair of magnetos, each having a rotor driven in the usual mechanical way (not shown) from the crankshaft of the associated engine whose speed, in relation to that of the second engine, is to be indicated. The electrical circuits of the magnetos include the usual primary and secondary windings 8 and 9, 11 and 12, respectively, and the usual condensers 13 and 14, and periodically opened circuit breakers 16 and 17; one side of each secondary circuit being grounded by way of the engine housing, as indicated at 18 and 19.

In order to produce, from the voltage impulses generated by the magnetos, alternating current to operate the synchronous motors 26 and 27, at voltages corresponding to the frequency of the said magneto voltage impulses, I connect said motors 26 and 27 in inductive relationship (through transformers 21 and 22) with the circuits of the oscillating current generators 28 and 29. These oscillating current generators 28 and 29 are shown as conventional power amplifying vacuum tubes having their control grids connected to the secondary windings (36 and 37, respectively) of transformers whose primary windings (38 and 39) are in the circuits of the magneto windings 8 and 11, respectively.

From the foregoing it will be apparent that the alternating current impulses of the magneto of engine A will be reflected in the vacuum tube 28, thereby causing a similar but much stronger alternating current to flow from the output transformer 21 to the synchronous motor 26. Since this current is controlled by, and similar to, the alternating current produced by the magneto of engine A, and since the frequency of the magneto current is directly proportional to the speed of said magneto, it follows that the speed of the synchronous motor 26 will be a measure of the speed of the said magneto and thus a measure of the speed of the engine A driving the said magneto. Obviously the same will be true of motor 27 and its associated engine B.

With this arrangement, each synchronous motor will be supplied with an alternating current of a frequency corresponding to the frequency of its associated magneto, and therefore the speed of the associated motor, 26 or 27, will be in synchronism with its magneto speed; and by mechanically connecting the rotors of the motors 26 and 27 through differential gearing 41, any difference in speed will cause rotation of the worm and sector device 42 which is linked to the valve 43 of engine B, to vary the quantity of the explosive mixture supplied to engine B. Thus the speed of said engine B will be varied to the extent required to re-establish synchronism between engines A and B. Additional engines, if any, may of course be similarly controlled by a mere duplication of the parts indicated.

This application is a continuation in part of my application No. 173,051, filed November 5, 1937.

What I claim is:

1. In combination with a pair of internal combustion engine driven magnetos, each having a primary circuit including engine driven breaker points, a pair of transformers, each having its primary winding constituting a part of one of said primary circuits, alternating current generating means including a vacuum tube grid element in the secondary circuit of one of said transformers and a second vacuum tube grid element in the secondary circuit of the other of said transformers, said generating means also including a third transformer having a primary circuit pulsating in synchronism with said first-named grid element, and a fourth transformer pulsating in synchronism with said second-named grid element, a motor in circuit with said third transformer, a second motor in circuit with said fourth transformer, and differential means driven by said motors.

2. In combination with a pair of internal combustion engine driven magnetos, each having a primary circuit including engine driven breaker points, a pair of transformers, each having a primary winding constituting a part of one of said primary circuits, a vacuum tube grid element in the secondary circuit of one of said transformers, a second vacuum tube grid element in the secondary circuit of the other of said transformers, a third transformer having a primary circuit pulsating in synchronism with said first-named grid element, a fourth transformer pulsating in synchronism with said second-named grid element, a pair of motors, means for synchronizing one of said motors with the pulsations in said third transformer, and means for synchronizing the other of said motors with the pulsations in said fourth transformer.

3. In combination with a pair of internal combustion engine driven magnetos, each having a primary circuit including engine driven breaker points, a pair of transformers, each having a primary winding constituting a part of one of said primary circuits, a vacuum tube grid element in the secondary circuit of one of said transformers, a second vacuum tube grid element in the secondary circuit of the other of said transformers, a pair of motors, means for synchronizing one of said motors with the energy impulses delivered to said first-named grid element, and means for synchronizing the other of said motors with the energy impulses delivered to said second-named grid element.

4. In combination with a pair of internal combustion engine driven magnetos, each having a primary circuit including engine driven breaker points, a pair of transformers, each having its primary winding constituting a part of one of said primary circuits, alternating current generating means including a vacuum tube grid element in the secondary circuit of one of said transformers and a second vacuum tube grid element in the secondary circuit of the other of said transformers, said generating means also including a third transformer having a primary circuit pulsating in synchronism with said first-named grid element, and a fourth transformer pulsating in synchronism with said second-named grid element, a motor in circuit with said third transformer, a second motor in circuit with said fourth transformer, and differential means driven by said motors, said differential means including a part movable only when the speed of one of said motors differs from that of the other.

5. In combination with a pair of internal combustion engine driven magnetos, each having a primary circuit including engine driven breaker points, a pair of transformers, each having its primary winding constituting a part of one of said primary circuits, alternating current generating means including a vacuum tube grid element in the secondary circuit of one of said transformers and a second vacuum tube grid element in the secondary circuit of the other of said transformers, said generating means also including a third transformer having a primary circuit pulsating in synchronism with said first-named grid element, and a fourth transformer pulsating in synchronism with said second-named grid element, a motor in circuit with said third transformer, a second motor in circuit with said fourth transformer, differential means driven by said motors, said differential means including a part movable only when the speed of one of said motors differs from that of the other, and engine fuel supply control means shiftable by movement of said last-named part.

6. In combination, an electron discharge device including a cathode, a grid, and a plate, a periodically interrupted magneto circuit coupled to said grid, a motor, and means for feeding alternating current to said motor at a frequency corresponding to the frequency of interruption of said magneto circuit, said means including a transformer whose primary winding is in circuit with said plate.

7. In combination, a pair of electron discharge devices, a pair of periodically interrupted magneto circuits coupled to said devices, a pair of motors, means for feeding alternating current to one of said motors at a frequency corresponding to the frequency of interruption of one of said magneto circuits, and means for feeding alternating current to the other of said motors at a frequency corresponding to the frequency of interruption of the other of said magneto circuits, said two last-named means including a source of current and circuits from said source to each of said electron discharge devices, means coupling one of said circuits to one of said motors, and means coupling the other of said circuits to the other of said motors.

CHARLES I. MacNEIL.